United States Patent  [19]

Mitchell

[11] 4,179,379
[45] Dec. 18, 1979

[54] PICK-UP NOZZLE

[75] Inventor: Robert D. Mitchell, Fond du Lac, Wis.

[73] Assignee: Firl Industries, Inc., Fond du Lac, Wis.

[21] Appl. No.: 880,433

[22] Filed: Feb. 23, 1978

[51] Int. Cl.² ............................................. B01D 35/28
[52] U.S. Cl. ................................. 210/242 R; 210/460
[58] Field of Search ..................... 210/459, 460, 242 R

[56] References Cited

U.S. PATENT DOCUMENTS

| 1,369,239 | 2/1921 | Gulick | 210/242 R |
| 2,015,274 | 9/1935 | Johnston | 210/460 |
| 2,175,256 | 10/1939 | Dick | 210/460 |
| 2,192,438 | 3/1940 | Gulick | 210/242 R |
| 2,318,220 | 5/1943 | Haselwood | 210/242 R |
| 2,924,179 | 2/1960 | Isaksson | 210/460 |
| 3,613,894 | 1/1970 | Clegg, Jr. | 210/459 |

Primary Examiner—Theodore A. Granger

Attorney, Agent, or Firm—Andrus, Sceales, Starke & Sawall

[57] ABSTRACT

The pick-up nozzle has a large flat inlet face with a gradually tapering housing extending upwardly therefrom to an angularly disposed inclined suction hose attachment. A filter screen is disposed across the inlet face with its periphery seated against a shoulder in the housing. Peripherally spaced feet extend downwardly from the housing periphery to support the screen above any surface upon which the nozzle may rest. A closure disc is spaced beneath the screen with its periphery engaging shoulders in the feet to protect the screen and restrict entrance of liquid thereto to the spaces between the several feet. A single vertical bolt suspends the screen and closure disc from the top of the housing with spacer sleeves thereon to secure the screen and disc in proper spaced position. The closure disc is dished upwardly to leave a space for the head of the bolt above the plane of the bottom of the feet. A float is pivotally attached to the top of the nozzle to maintain the latter at a preferred level in the water.

4 Claims, 5 Drawing Figures

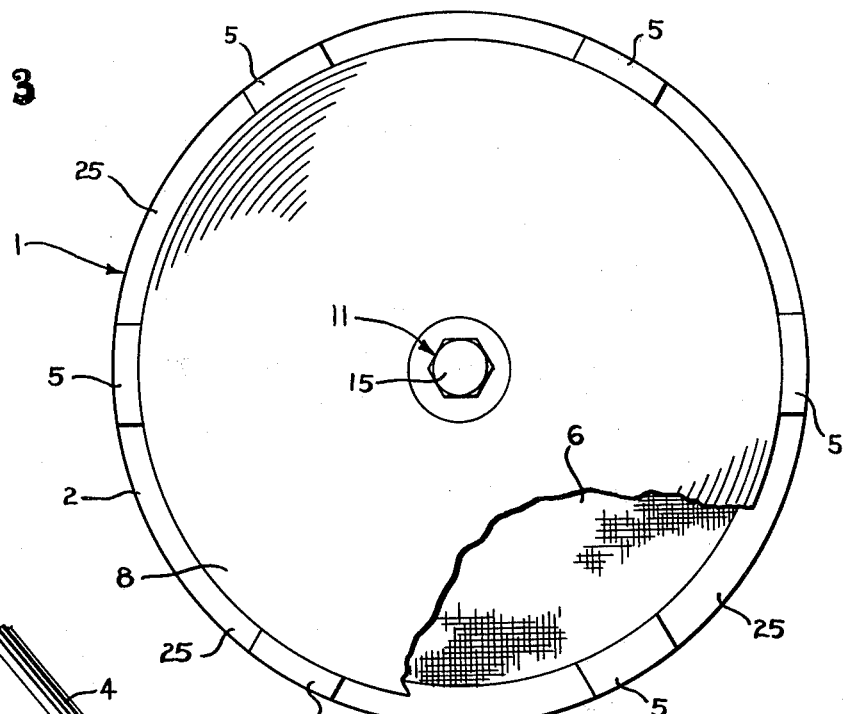
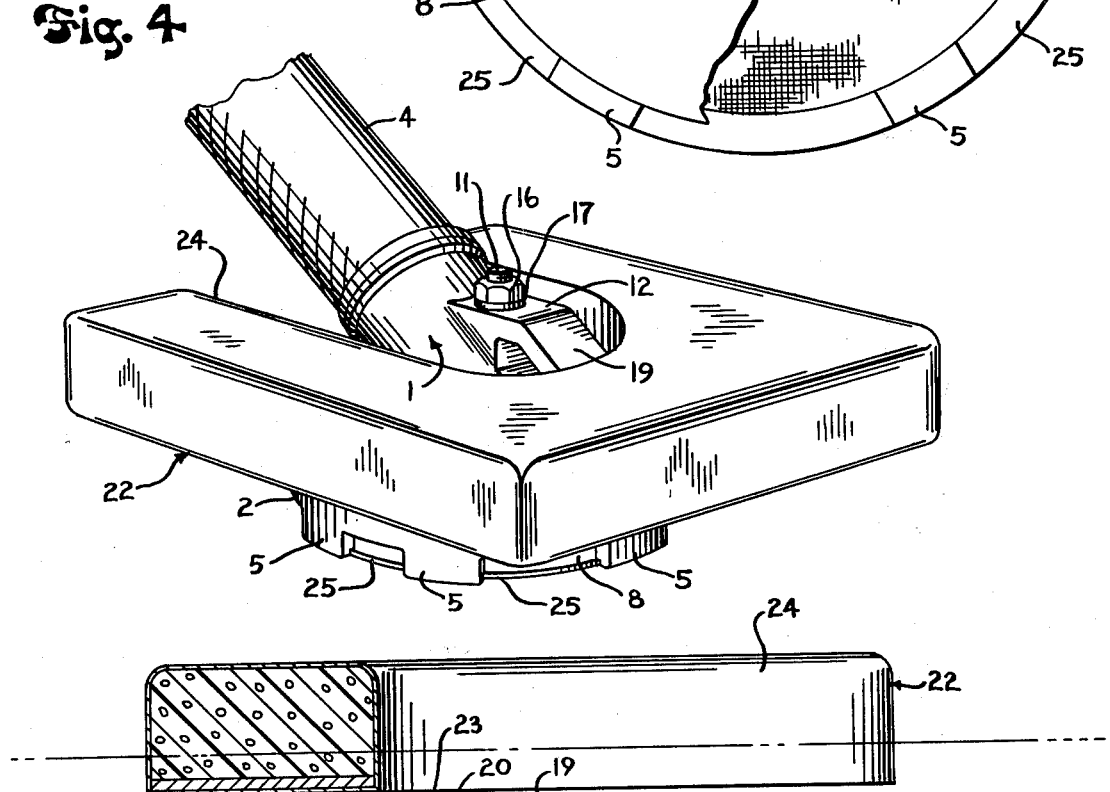
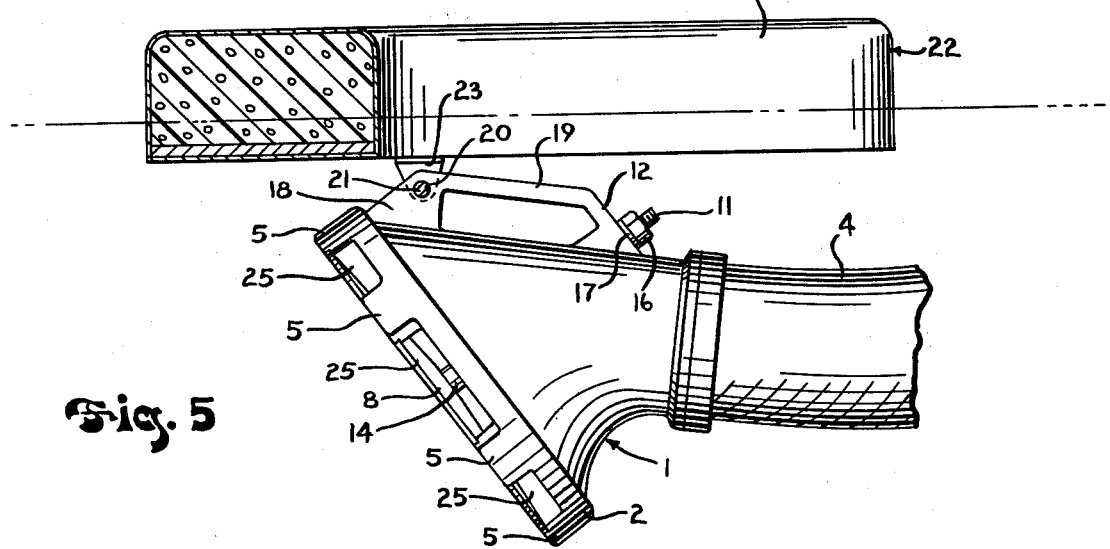

PICK-UP NOZZLE

BACKGROUND OF THE INVENTION

In connection with the fighting of forest fires and rural fires it frequently becomes necessary to utilize water from various reservoirs, ponds and lakes and which is pumped into portable tanks and then transported and dumped on the fire.

Pick-up nozzles for this purpose as well as those used in pumping oil and the like from spills occurring on large bodies of water have had various details of construction for maintaining their position and preventing damage from debris and the like.

Since the nozzles are connected to a suction pump it becomes essential that they protect the pump against damage from various solid objects and debris.

Furthermore it is important to prevent clogging of the nozzles.

"Float Dock" strainers put out by Fol-Da-Tank Company of Rock Island, Illinois have been a type of nozzle heretofore employed. Another is the "Ken-Mar" low-level strainer marketed by Ken-Mar, Inc. of High Point, North Carolina.

The "Float Dock" strainer is said to maintain suction intake only to within approximately five inches of the bottom upon which it rests, and the "Ken-Mar" strainer is said to maintain suction only to within four inches of the bottom.

SUMMARY OF THE INVENTION

The pick-up nozzle of the present invention has a large mouth tapering gradually to the hose connection and providing a unique assembly of a screen across the mouth and a shield protecting the screen, both held by a single central suspension means which provides for ready disassembly for cleaning and repair purposes.

The screen and shield are spaced vertically and have their peripheries engaging corresponding spaced shoulders within the body of the nozzle, and the nozzle body is cut away to provide peripherally spaced inlet openings between the screen and the shield.

The suspension means preferably constitutes a bolt extending upwardly through the body of the nozzle and having spacer sleeves thereon to position the screen and the shield in the desired spaced relation and location in the nozzle.

The shield may be dished upwardly to provide a maximum spacing from the screen at its periphery and to provide a space between it and the ground or bottom of the tank in which the nozzle operates to accommodate the bolt head or nut.

BRIEF DESCRIPTION OF THE DRAWING

The invention is illustrated in the accompanying drawings showing the preferred embodiment presently contemplated by the applicant.

FIG. 3 is a bottom plan view of the nozzle with parts broken away to show the screen;

FIG. 4 is a perspective view showing the nozzle suspended by a float; and

FIG. 5 is a side elevation taken of FIG. 4 with the float sectioned on its longitudinal vertical plane.

DESCRIPTION OF THE PREFERRED EMBODIMENT

Figure 1:
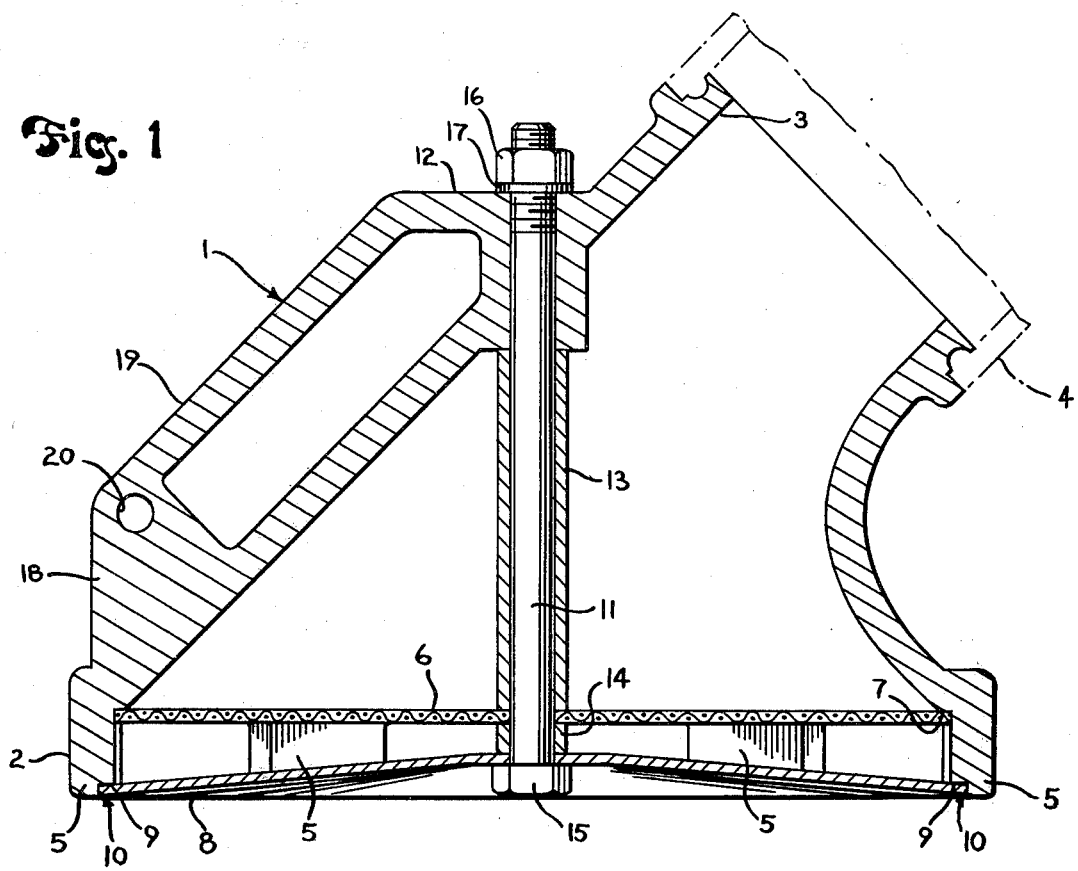
FIG. 1 is a longitudinal central section of the nozzle.
Figure 2:
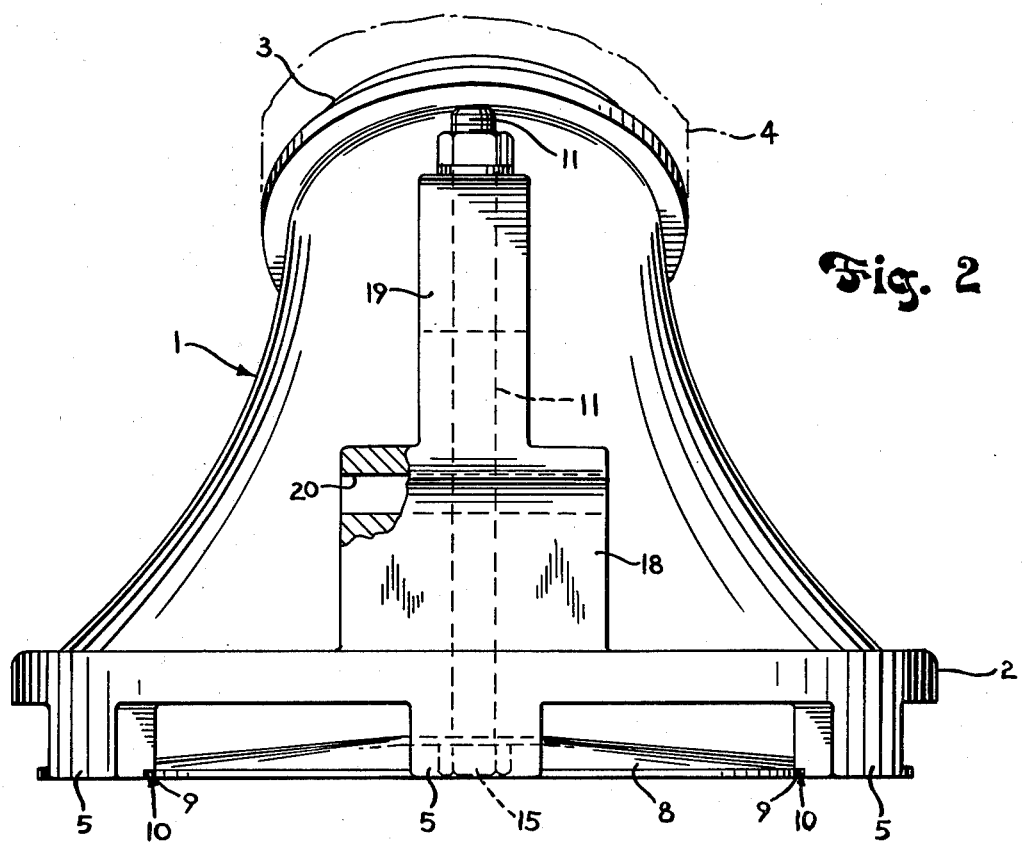
FIG. 2 is a front elevation of the nozzle with parts broken away and sectioned.

The pick-up nozzle illustrated in the drawings comprises a generally tubular nozzle body 1 having a circular base 2 of substantial diameter and tapering upwardly and rearwardly at an acute angle, preferably about 45° from the plane of the base, to a flanged opening 3 for attachment of a suction hose 4.

The base 2 constitutes generally the mouth or inlet for the nozzle and is of substantially larger diameter than that of flanged opening 3. The base 2 is preferably made circular for convenience, but it could be of any other suitable configuration.

The periphery of base 2 comprises a plurality of peripherally spaced feet 5 extending downwardly to a common generally horizontal plane for supporting the nozzle upon the ground or tank bottom when not floating.

A screen 6 is disposed across the mouth of the nozzle and has its periphery held against a downwardly facing shoulder 7 internally of base 2 and just above the feet 5.

A shield or suction foot 8 extends across the mouth of the nozzle and closes it in the general supporting plane of feet 5. The suction foot 8 comprises an upwardly dished plate having its periphery fitting against the downwardly facing shoulders 9 of notches 10 in the feet 5.

Both screen 6 and suction foot 8 are suspended and held in position by a single central bolt 11 extending vertically therethrough and through the top of nozzle body 1.

For this purpose the nozzle body 1 is formed on its top to provide an integral ledge 12 having a vertical bore therethrough to receive the bolt 11.

A spacer sleeve 13 is provided on bolt 11 between ledge 12 and screen 6 to position the latter, and a similar spacer sleeve 14 is provided on bolt 11 between screen 6 and suction foot 8 to retain the latter in proper spaced position.

The head 15 of bolt 11 is disposed at the lower end of the bolt and by reason of the suction foot 8 being dished upwardly the head 15 is above the supporting plane of feet 5.

The nut 16 and washer 17 serve to secure the bolt 11 on ledge 12 at the upper end of the bolt.

The front of body 1 is provided with a lug 18 with a brace 19 extending up to ledge 12 and with a transverse bore 20 for removably receiving a pivot pin 21 attaching the nozzle to float 22.

The float 22 is preferably a block of synthetic sponge such as foamed polyurethane, and has a lug 23 attached to the bottom near the center for receiving pivot pin 21 whereby the nozzle may be suspended in the water from the float.

The float 22 has a vertical slot constituting a recess 24 for freely receiving the upper end of the nozzle body 2 and hose 4 during pivoting of the nozzle relative to the float.

In service the float maintains the nozzle near the surface of the water, but low enough to avoid clogging by most floating debris, and as the water level lowers the base 2 of the nozzle finally comes to rest on the bottom with the float tilting freely on the nozzle and not interfering with the nozzle suction.

The suction foot 8 serves as a shield to protect the screen 6 from damage by debris and the lateral inlet openings 25 between the feet 5 generally fend off any debris.

The total cross sectional volume capacity of inlet openings 25 is preferably substantially less than the area of the screen 6 so that the velocity of the water passing through the screen will generally be reduced, and then will increase again as it approaches hose 4.

The nozzle can be disassembled easily for cleaning purposes and readily assembled again.

Various modes of carrying out the invention are contemplated as being within the scope of the following claims, particularly pointing out and distinctly claiming the subject matter which is regarded as the invention.

I claim:

1. A pickpup nozzle comprising a tapered generally tubular body having its upper smaller end adapted to be connected to a suction conduit and disposed at an angle to the flat base of the lower larger end, a filter screen disposed across said base, means extending downwardly from the upper side of the inclined nozzle body and connecting centrally of said screen to suspend the same, a lug on said nozzle body above said base and forward of said small end, a float having a bracket beneath the same complementary to said lug, and a removable pivot means connecting said lug and said bracket to pivotally suspend said nozzle body from said float, said float having a recess therein to accommodate said nozzle body in upward pivoting position.

2. A pick-up nozzle comprising a tapered generally tubular body having its upper smaller end adapted to be connected to a suction conduit and disposed at an angle to the flat base of the lower larger end, a filter screen disposed across said base, a bolt extending downwardly through the upper side of the inclined nozzle body forwardly of said smaller end and through said filter screen to suspend the same, a spacer sleeve on said bolt between said screen and the nozzle body, a ledge formed integrally in the upper side of said nozzle body for receiving and supporting said bolt, a lug on said nozzle body forward of said ledge and connected therewith, a float having a bracket beneath the same complementary to said lug, and removable pivot means connecting said lug and bracket to pivotally suspend said nozzle body from said float, said float having a recess therein to accommodate said nozzle body in upward pivoting position.

3. A pick-up nozzle comprising a tapered generally tubular body having its upper smaller end adapted to be connected to a suction conduit and disposed at an angle to the flat base of the lower larger end, a filter screen disposed across said base, an internal downwardly facing shoulder in said base receiving the periphery of said screen, peripherally spaced feet extending downwardly from said nozzle body beyond said screen to provide lateral inlets to said screen, a plate extending across said base and having its periphery engaging the lower end portions of said feet, a bolt extending downwardly through the upper side of said nozzle body and through the center of said filter screen and plate, spacer sleeves on said bolt between said nozzle body and screen and between said screen and said plate, said plate being dished upwardly to provide a space for the head of said bolt beneath the center of said plate and the plane of the lower end of said feet, a ledge formed integrally in the upper side of said nozzle body for receiving and supporting the upper end of said bolt, a lug on said nozzle body forward of said ledge and connected therewith, a float having a bracket beneath the same complementary to said lug, and removable pivot means connecting said lug and bracket to pivotally suspend said nozzle body from said float, said float having a recess therein to accommodate said nozzle body in upward pivoting position.

4. A pick-up nozzle comprising a tapered generally tubular body having its upper smaller end adapted to be connected to a suction conduit and disposed at an angle to the flat base of the lower larger end, an internal downwardly facing shoulder extending peripherally of said base, a filter screen suspended across said base and retained upwardly against said peripheral shoulder, spaced peripheral feet on said base extending downwardly beyond the base of said screen to support the nozzle and provide for the flow of fluid to said screen through the spaces between said feet, a plate extending across the bottom of said feet to protect said screen, a ledge formed in the upper inclined body portion of said nozzle body centrally above said base, a single bolt extending downwardly through said ledge and centrally through said screen and plate, and spacer sleeves on said bolt between said upper body portion and said screen and between said screen and plate to determine the suspension of said screen by said bolt in spaced relation to said plate, said plate being dished upwardly to provide a space for the head of said bolt beneath the center of said plate and the plane of the lower end of said feet.

* * * * *